US009905891B2

(12) United States Patent
Ryu et al.

(10) Patent No.: US 9,905,891 B2
(45) Date of Patent: Feb. 27, 2018

(54) BATTERY CELL PROVIDED WITH CUT PORTION AND BATTERY PACK COMPRISING THE SAME

(71) Applicant: LG Chem, Ltd., Seoul (KR)

(72) Inventors: Sang Baek Ryu, Daejeon (KR); Dong-Myung Kim, Daejeon (KR); Ki Woong Kim, Daejeon (KR)

(73) Assignee: LG Chem, Ltd. (KR)

( * ) Notice: Subject to any disclaimer, the term of this patent is extended or adjusted under 35 U.S.C. 154(b) by 287 days.

(21) Appl. No.: 14/758,860

(22) PCT Filed: Feb. 20, 2014

(86) PCT No.: PCT/KR2014/001359
§ 371 (c)(1),
(2) Date: Jul. 1, 2015

(87) PCT Pub. No.: WO2014/137085
PCT Pub. Date: Sep. 12, 2014

(65) Prior Publication Data

US 2015/0372353 A1 Dec. 24, 2015

(30) Foreign Application Priority Data

Mar. 4, 2013 (KR) ........................ 10-2013-0022615

(51) Int. Cl.
*H01M 2/02* (2006.01)
*H01M 10/42* (2006.01)
*H01M 4/13* (2010.01)
*H01M 4/70* (2006.01)
(Continued)

(52) U.S. Cl.
CPC ....... *H01M 10/4257* (2013.01); *H01M 2/021* (2013.01); *H01M 2/0202* (2013.01); *H01M 2/024* (2013.01); *H01M 2/0207* (2013.01); *H01M 2/0212* (2013.01); *H01M 2/0237* (2013.01); *H01M 2/0275* (2013.01);
(Continued)

(58) Field of Classification Search
None
See application file for complete search history.

(56) References Cited

U.S. PATENT DOCUMENTS 6,861,821 B2 3/2005 Masumoto et al.
8,426,057 B2 * 4/2013 Park .................... H01M 2/0212 429/159

(Continued)

FOREIGN PATENT DOCUMENTS

CN 102097643 A 6/2011
CN 104247094 A 12/2014

(Continued)

OTHER PUBLICATIONS

International Search Report for Application No. PCT/KR2014/001359 dated May 23, 2014.

*Primary Examiner* — Tracy Dove
(74) *Attorney, Agent, or Firm* — Lerner, David, Littenberg, Krumholz & Mentlik, LLP

(57) ABSTRACT

Disclosed herein is a battery cell including an electrode assembly including a positive electrode, a negative electrode, and a separator disposed between the positive electrode and the negative electrode, and a case in which the electrode assembly is mounted, wherein a body of the electrode assembly and a body of the case are provided with cut portions.

23 Claims, 3 Drawing Sheets

200

250
112
111
120
110

(51) Int. Cl.

| | |
|---|---|
| ***H01M 10/04*** | (2006.01) |
| ***H01M 10/052*** | (2010.01) |
| ***H01M 10/058*** | (2010.01) |

(52) U.S. Cl.

CPC ............... *H01M 4/13* (2013.01); *H01M 4/70* (2013.01); *H01M 10/0413* (2013.01); *H01M 10/0436* (2013.01); *H01M 10/052* (2013.01); *H01M 10/058* (2013.01); *H01M 10/425* (2013.01); *H01M 2010/4271* (2013.01); *H01M 2220/10* (2013.01); *H01M 2220/20* (2013.01); *H01M 2220/30* (2013.01); *Y02T 10/7011* (2013.01)

(56) References Cited

U.S. PATENT DOCUMENTS

| | | | | |
|---|---|---|---|---|
| 9,548,475 | B2 * | 1/2017 | Kang | H01M 2/0287 |
| 2004/0048149 | A1 | 3/2004 | Gross et al. | |
| 2007/0196733 | A1 | 8/2007 | Lee | |
| 2011/0064991 | A1 | 3/2011 | Ahn | |
| 2011/0274955 | A1 | 11/2011 | Park et al. | |
| 2014/0023887 | A1 | 1/2014 | Lim | |
| 2015/0037664 | A1 | 2/2015 | Kang et al. | |
| 2015/0086842 | A1 | 3/2015 | Kang et al. | |

FOREIGN PATENT DOCUMENTS

| | | | |
|---|---|---|---|
| CN | 104272492 | A | 1/2015 |
| JP | 10-27602 | | 1/1998 |
| JP | 2011065996 | A | 3/2011 |
| JP | 2012243556 | A | 12/2012 |
| KR | 20040014990 | A | 2/2004 |
| KR | 20060029751 | A | 4/2006 |
| KR | 20100081484 | A | 7/2010 |
| KR | 20110105737 | A | 9/2011 |
| KR | 20120108677 | A | 10/2012 |

* cited by examiner

【FIG. 1A】
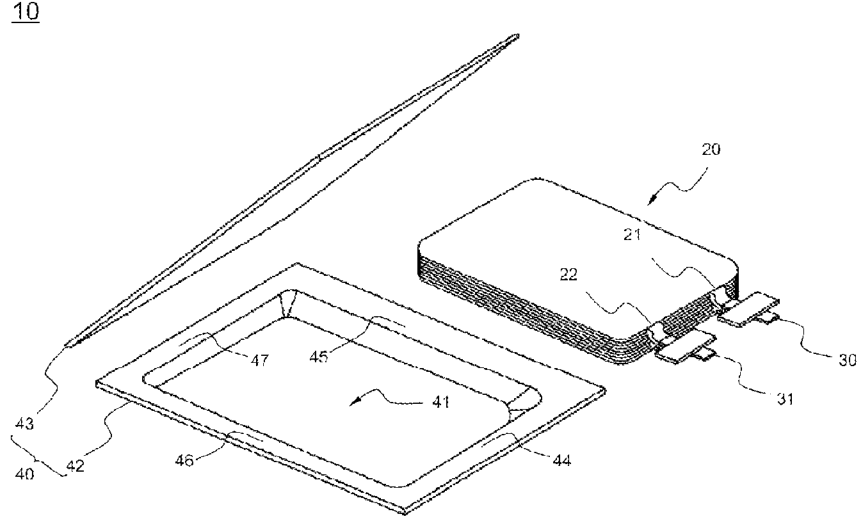
【FIG. 1B】
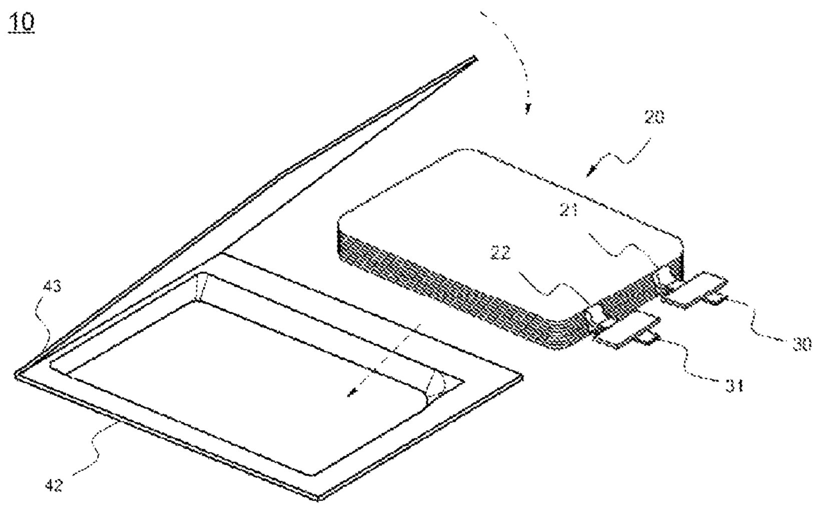

【FIG. 1C】
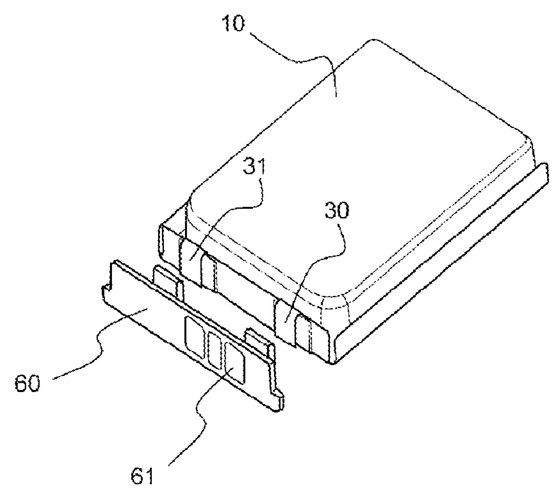
【FIG. 2】
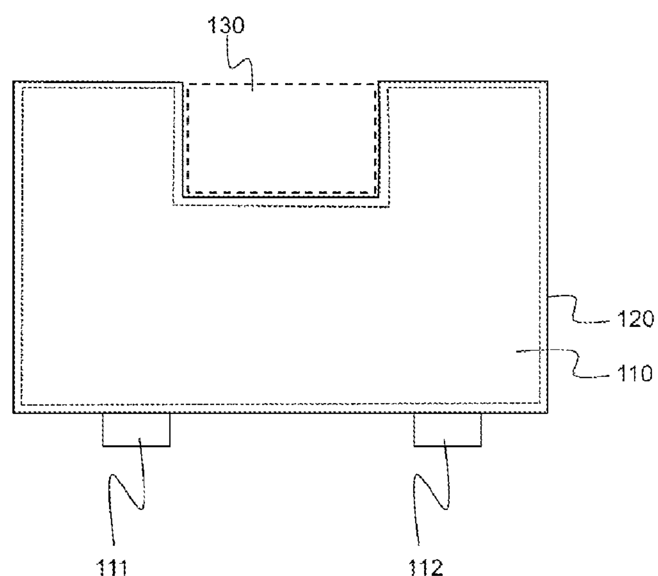

【FIG. 3】
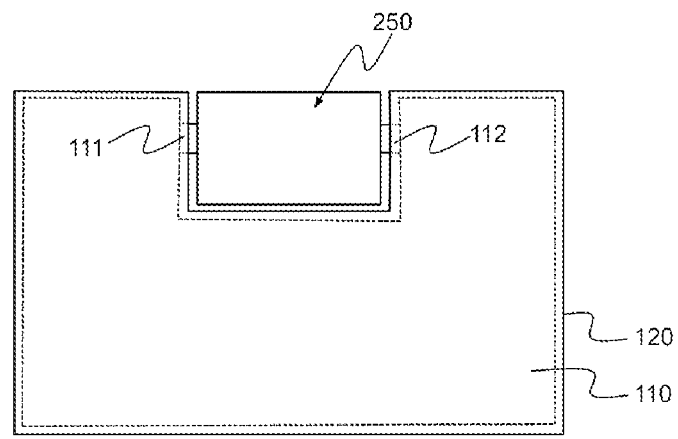
【FIG. 4】
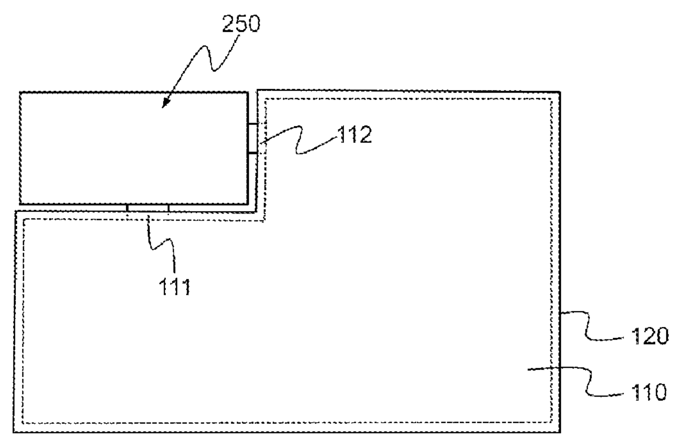

BATTERY CELL PROVIDED WITH CUT PORTION AND BATTERY PACK COMPRISING THE SAME

CROSS REFERENCE TO RELATED APPLICATIONS

The present application is a national phase entry under 35 U.S.C. § 371 of International Application No. PCT/KR2014/001359, filed Feb. 20, 2014, which claims priority from Korean Patent Application No. 10-2013-0022615, filed Mar. 4, 2013, all of which are hereby incorporated herein by reference.

TECHNICAL FIELD

The present invention relates to a battery cell provided with a cut portion and a battery pack including the same.

BACKGROUND ART

With remarkable development of information technology (IT), a great variety of portable information communication devices has been popularized. As a result, in the 21$^{st}$ century, we are moving toward a ubiquitous society in which high-quality information service is possible regardless of time and place.

Lithium secondary batteries are very important to realize such a ubiquitous society. Specifically, lithium secondary batteries, which can be charged and discharged, have been widely used as an energy source for wireless mobile devices. In addition, the lithium secondary batteries have also been used as an energy source for electric vehicles and hybrid electric vehicles, which have been proposed to solve problems, such as air pollution, caused by existing gasoline and diesel vehicles using fossil fuel.

As devices, to which the lithium secondary batteries are applicable, are diversified as described above, the lithium secondary batteries have also been diversified such that the lithium secondary batteries can provide outputs and capacities suitable for devices to which the lithium secondary batteries are applied. In addition, there is a strong need to reduce the size and weight of the lithium secondary batteries.

Small-sized mobile devices, such as mobile phones, personal digital assistants (PDAs), digital cameras, and laptop computers, use one or several small-sized, lightweight battery cells for each device according to the reduction in size and weight of the corresponding products.

The battery cells may be classified into a cylindrical battery cell, a prismatic battery cell, and a pouch-shaped battery cell based on the shapes thereof. Among these battery cells, the pouch-shaped battery cell, which can be stacked with high integration, has a high energy density per weight, and is inexpensive, has attracted considerable attention.

FIGS. 1A and 1B are exploded perspective views typically showing a general structure of a conventional representative pouch-shaped battery cell.

Referring to FIG. 1A, a pouch-shaped battery cell 10 includes an electrode assembly 20 having pluralities of electrode tabs 21 and 22 protruding therefrom, two electrode leads 30 and 31 respectively connected to the electrode tabs 21 and 22, and a battery case 40, in which the electrode assembly 20 is received in a sealed state such that the electrode leads 30 and 31 are partially exposed outward from the battery case 40.

The battery case 40 includes a lower case 42 having a depressed receiving part 41, in which the stacked type electrode assembly 20 is located, and an upper case 43 for covering the lower case 42 such that the electrode assembly 20 is sealed in the battery case 40. The upper case 43 and the lower case 42 are connected to each other by thermal welding in a state in which the electrode assembly 20 is mounted therein to form an upper end sealed part 44, side sealed parts 45 and 46, and a lower end sealed part 47.

As shown in FIG. 1A, the upper case 43 and the lower case 42 may be configured as separate members. As shown in FIG. 1B, on the other hand, one end of the upper case 43 may be integrally formed at a corresponding end of the lower case 42 such that the upper case 43 and the lower case 42 may be hingedly connected to each other.

In addition, as shown in FIGS. 1A and 1B, the pouch-shaped battery cell is configured to have a structure in which electrode terminals constituted by the electrode tabs and the electrode leads connected to the electrode tabs are formed at one end of the electrode assembly. Alternatively, a pouch-shaped battery cell configured to have a structure in which electrode terminals are formed at one end and the other end of an electrode assembly may also be manufactured using the above-described method.

Meanwhile, FIGS. 1A and 1B show the stacked type electrode assembly. Alternatively, the pouch-shaped secondary battery of FIGS. 1A and 1B may be manufactured using a jelly-roll type (wound type) electrode assembly configured to have a structure in which a long sheet type positive electrode and a long sheet type negative electrode are wound in a state in which a long sheet type separator is disposed between the positive electrode and the negative electrode or a stacked and folded type electrode assembly configured to have a structure in which a plurality of stacked type electrode assemblies is folded using a continuous separation film having a long length.

In general, a protection circuit module (PCM) that is capable of effectively controlling an abnormal state, such as overcharge or overcurrent, of the lithium secondary battery is mounted in the lithium secondary battery in a state in which the PCM is connected to a battery cell of the lithium secondary battery.

FIG. 1C is an exploded perspective view typically showing a conventional battery pack configured to have a structure in which a PCM is mounted at a pouch-shaped battery cell.

Referring to FIG. 1C, a battery pack 50 includes a pouch-shaped battery cell 10 having electrode terminals 30 and 31 protruding therefrom and a PCM 60 mounted at the pouch-shaped battery cell 10 in a state in which the PCM 60 is connected to the electrode terminals 30 and 31, external input and output terminals 61 being exposed from the PCM 60.

DISCLOSURE

Technical Problem

As shown in FIGS. 1A and 1B, a pouch-shaped battery cell is generally manufactured to have a hexahedral shape. A PCM is coupled to the hexahedral pouch-shaped battery cell to constitute a battery pack having a hexahedral shape.

In a device using a battery cell or a battery pack as a power source is generally mounted a plurality of electronic components and/or mechanical components together with the battery cell or the battery pack. The internal space of the device in which the electronic components and/or the mechanical components are mounted does not exactly correspond to a hexahedral shape of the battery cell or the battery pack. As a result, the hexahedral battery cell or battery pack may form dead spaces in the device.

For example, a camera basically mounted in a recent smart phone is generally located at the middle of the upper part of a side of a phone body opposite to a display unit. In this case, however, dead spaces, in which the battery cell or the battery pack cannot be mounted, may be formed at opposite sides of the camera. Ultimately, such dead spaces lower the capacity of the device per volume.

Therefore, the present invention has been made to solve the above problems, and it is an object of the present invention to provide a battery cell that is capable of maximally increasing the capacity of a device per volume and a battery pack including the same.

Technical Solution

In accordance with one aspect of the present invention, the above and other objects can be accomplished by the provision of a battery cell including an electrode assembly including a positive electrode, a negative electrode, and a separator disposed between the positive electrode and the negative electrode, and a case in which the electrode assembly is mounted, wherein a body of the electrode assembly and a body of the case are provided with cut portions.

The cut portions may be parts formed by cutting portions of electrodes including electrode current collectors having electrode slurry layers formed thereon, e.g. a portion of a positive electrode including a positive electrode current collector having a positive electrode slurry layer formed thereon, a portion of a negative electrode including a negative electrode current collector having a negative electrode slurry layer formed thereon, and a portion of the body of the case.

In particular, the cut portion of the electrode assembly is a part formed by cutting portions of electrodes having the electrode slurry layers formed thereon. Consequently, the electrode assembly according to the present invention has a structure different from that of a conventional electrode assembly.

That is, the conventional electrode assembly is configured such that electrode slurry layers are formed only at portions of electrodes excluding electrode tabs protruding from the electrodes. In the electrode assembly according to the present invention, however, the electrode slurry layers may be partially or entirely formed at the electrode tabs of the conventional electrode assembly.

In the electrode assembly according to the present invention, the positive electrode may be provided with a positive electrode tab having no positive electrode slurry layer formed thereon, and the negative electrode may be provided with a negative electrode tab having no negative electrode slurry layer formed thereon. The positive electrode tab and the negative electrode tab may protrude toward the cut portions. Alternatively, the positive electrode tab and the negative electrode tab may protrude in a direction not facing the cut portions.

The positive electrode tab and the negative electrode tab may constitute a positive electrode terminal and a negative electrode terminal, respectively. Alternatively, a positive electrode lead and a negative electrode lead may be coupled to the positive electrode tab and the negative electrode tab to constitute a positive electrode terminal and a negative electrode terminal, respectively. The positive electrode terminal and the negative electrode terminal may be disposed in tight contact with the body of the case in a state in which the positive electrode terminal and the negative electrode terminal are bent. Alternatively, the positive electrode terminal and the negative electrode terminal may not be bent.

The cut portion of the electrode assembly may correspond to the cut portion of the case. Alternatively, the cut portion of the electrode assembly may not correspond to the cut portion of the case. Preferably, the cut portion of the electrode assembly and the cut portion of the case exactly correspond to each other. That is, the cut portion of the case may be formed at a part at which the cut portion of the electrode assembly is formed.

In addition, the shape of the cut portion of the electrode assembly and the cut portion of the case is not particularly restricted so long as the cut portion of the electrode assembly and the cut portion of the case each have a shape engaged with parts of a device which concavely protrude due to components mounted in the device.

According to circumstances, a protection circuit member for preventing overcharge, overdischarge, and explosion of the battery cell may be mounted in the cut portion of the case. The protection circuit member may be electrically connected to the positive electrode tab formed at the positive electrode of the electrode assembly and the negative electrode tab formed at the negative electrode of the electrode assembly. In this case, the positive electrode tab and the negative electrode tab may protrude toward the cut portion.

The protection circuit member comprises a protection circuit board, a field effect transistor (FET) and a protection circuit formed at the protection circuit board, and a connection terminal electrically connected to the positive electrode terminal and the negative electrode terminal of the battery cell. For example, the protection circuit member may be a protection circuit module (PCM).

Preferably, the positive electrode tab and the negative electrode tab may protrude toward the cut portion and may be disposed in tight contact with the body of the case in a state in which the positive electrode terminal and the negative electrode terminal are bent so as to minimize dead spaces in the device and to manufacture a compact battery cell. At this time, the connection terminal of the protection circuit member may be disposed in tight contact with the protection circuit board in a state in which the connection terminal is bent.

The size or volume of the protection circuit member is not particularly restricted so long as the protection circuit member can be received in the cut portion. That is, so long as the protection circuit member can be received in the cut portion of the body of the case, the horizontal length and the vertical length of the protection circuit member may be less than those of the cut portion. Consequently, the height of the protection circuit member may be greater than that of the cut portion. In this case, the height of the protection circuit member may protrude from the cut portion.

According to circumstances, the cut portion provided at the body of the case may have a shape similar to that of the protection circuit member. More specifically, a similarity ratio of the protection circuit member to the cut portion provided at the body of the case may be 1 or less. The similarity ratio may mean a ratio of corresponding parts of similar polygons.

The electrode assembly may be a stacked type electrode assembly, comprising a positive electrode plate, a negative electrode plate, and a separation plate disposed between the positive electrode plate and the negative electrode plate, which is configured to have a structure in which the positive electrode plate, the separation plate, and the negative electrode plate are sequentially stacked.

In addition, the electrode assembly may include two or more polar bodies selected from a group consisting of a positive electrode plate, a negative electrode plate, and a stacked type electrode assembly, and a separation sheet for covering stacked surfaces and sides of the polar bodies, and each of the polar bodies may be configured to have a stacked and folded type structure in which the positive electrode and the negative electrode are stacked in a height direction on the basis of a plane such that the positive electrode and the negative electrode face each other in a state in which the separation sheet is disposed between the positive electrode and the negative electrode. At this time, the stacked type electrode assembly may be configured to have a structure in which an uppermost electrode plate and a lowermost electrode plate have the same polarity or different polarities.

The shape of the battery cell is not particularly restricted so long as the battery cell has a shape corresponding to the remaining space of the device excluding the space of the device in which the components are mounted. Specifically, the battery cell may be any one selected from a group consisting of a battery cell having a circular planar structure, a battery cell having a polygonal planar structure, a battery cell having a polygonal planar structure in which at least one corner is curved, and a battery cell having a polygonal planar structure in which at least one side is curved.

The case may be a pouch-shaped case, configured to have a structure with a space for receiving the electrode assembly, formed of a metal can or a laminate sheet including a resin layer and a metal layer.

At this time, the battery cell may be a prismatic battery cell having an electrode assembly including a positive electrode, a negative electrode, and a separator disposed between the positive electrode and the negative electrode mounted in a metal can or a pouch-shaped battery cell having an electrode assembly including a positive electrode, a negative electrode, and a separator disposed between the positive electrode and the negative electrode mounted in a pouch-shaped case. In the pouch-shaped battery cell, a positive electrode terminal and a negative electrode terminal formed respectively at the positive electrode and the negative electrode may protrude outward from the pouch-shaped case.

In a preferred embodiment of the present invention, the battery cell according to the present invention may be a battery cell provided with a cut portion in which a protection circuit member is coupled.

In accordance with other aspects of the present invention, there are provided a battery pack including one or more battery cells with the above-stated construction and a device including the battery pack as a power source.

An example of the device, in which the battery pack according to the present invention may be used, may be any one selected from among a mobile phone, a portable computer, a smart phone, a smart pad, a netbook computer, a light electronic vehicle (LEV), an electric vehicle, a hybrid electric vehicle, a plug-in hybrid electric vehicle, and a power storage device. However, the present invention is not limited thereto.

The structure and manufacturing method of the device are well known in the art to which the present invention pertains, and therefore a detailed description thereof will be omitted.

DESCRIPTION OF DRAWINGS

The above and other objects, features and other advantages of the present invention will be more clearly understood from the following detailed description taken in conjunction with the accompanying drawings, in which:

FIGS. 1A to 1C are exploded perspective views showing a conventional representative pouch-shaped secondary battery;

FIG. 2 is a plan view typically showing a pouch-shaped battery cell according to an embodiment of the present invention;

FIG. 3 is a plan view typically showing a battery pack according to an embodiment of the present invention; and FIG. 4 is a plan view typically showing a battery pack according to another embodiment of the present invention.

BEST MODE

Now, exemplary embodiments of the present invention will be described in detail with reference to the accompanying drawings. It should be noted, however, that the scope of the present invention is not limited by the illustrated embodiments.

FIG. 2 is a plan view typically showing a pouch-shaped battery cell according to an embodiment of the present invention.

Referring to FIG. 2, a pouch-shaped battery cell includes an electrode assembly 110, a case 120 in which the electrode assembly 110 is mounted, cut portions 130 formed at the electrode assembly 110 and the case 120, and a positive electrode terminal 111 and a negative electrode terminal 112 protruding outward from the case 120. The positive electrode terminal 111 and the negative electrode terminal 112 protrude in a direction not facing the cut portion 130.

The positive electrode terminal 111 may be a positive electrode tab having no positive electrode slurry layer formed on a positive electrode current collector or a combination of a positive electrode tab and a positive electrode lead coupled to the positive electrode tab. The negative electrode terminal 112 may be a negative electrode tab having no negative electrode slurry layer formed on a negative electrode current collector or a combination of a negative electrode tab and a negative electrode lead coupled to the negative electrode tab.

The cut portions 130 formed at both the electrode assembly 110 and the case 120 each have a rectangular shape. The cut portion 130 of the electrode assembly 110 and the cut portion 130 of the case 120 are similar in shape to each other.

Protruding parts of electronic components and/or mechanical components of a device may be received in the cut portions 130. As shown in FIGS. 3 and 4, a protection circuit module may be mounted in the cut portions 130.

FIGS. 3 and 4 are plan views typically showing battery packs 200 according to embodiments of the present invention.

Referring to FIGS. 3 and 4 together with FIG. 2, a positive electrode terminal 111 and a negative electrode terminal 112 protrude toward cut portions 130 unlike FIG. 2. A protection circuit module 250 is mounted in the cut portions 130.

Referring to FIGS. 3 and 4 together with FIG. 1C, the protection circuit module 250 is not mounted on a hexahedral battery cell but is mounted in the cut portions 130 to constitute hexahedral battery packs 200 unlike FIG. 1C.

Although the preferred embodiments of the present invention have been disclosed for illustrative purposes, those skilled in the art will appreciate that various modifications, additions and substitutions are possible, without departing from the scope and spirit of the invention as disclosed in the accompanying claims.

INDUSTRIAL APPLICABILITY

As is apparent from the above description, the battery cell according to the present invention and the battery pack including the same include cut portions configured to each have a shape that can be engaged with protruding parts of electronic components and/or mechanical components mounted in a device or a shape similar to that of a protection circuit member, thereby increasing the capacity of the device per volume as compared with a conventional battery cell or battery pack.

The invention claimed is:

1. A battery cell comprising:

an electrode assembly comprising a positive electrode, a negative electrode, and a separator disposed between the positive electrode and the negative electrode, the positive electrode including a body portion defined by a portion of a positive electrode current collector having a positive electrode slurry layer formed thereon, and the negative electrode including a body portion defined by a portion of a negative electrode current collector having a negative electrode slurry layer formed thereon, wherein the body portions of the positive and negative electrodes together with a portion of the separator disposed therebetween define a body of the electrode assembly; and a case in which the electrode assembly is mounted, wherein the body of the electrode assembly and a body of the case are provided with cut portions, wherein the cut portion of the electrode assembly defines a concavity extending into the body of the electrode assembly, wherein the cut portion of the case defines a concavity extending into the body of the case, and wherein the concavity of the case is received within the concavity of the electrode assembly.

2. The battery cell according to claim 1, wherein the positive electrode is provided with a positive electrode tab having no positive electrode slurry layer formed thereon, and the negative electrode is provided with a negative electrode tab having no negative electrode slurry layer formed thereon.

3. The battery cell according to claim 2, wherein the positive electrode tab and the negative electrode tab protrude toward the cut portions.

4. The battery cell according to claim 2, wherein the positive electrode tab and the negative electrode tab protrude in a direction not facing the cut portions.

5. The battery cell according to claim 1, wherein the cut portion of the case and the cut portion of the electrode assembly each have a shape configured to receive parts of a device which protrude due to components mounted in the device.

6. The battery cell according to claim 1, further comprising:

a protection circuit member for securing safety of the battery cell from overcharge, overdischarge, overcurrent, and high current of the battery cell, wherein the protection circuit member is incorporated in the cut portion provided at the body of the case.

7. The battery cell according to claim 6, wherein the cut portion provided at the body of the case has a shape similar to that of the protection circuit member.

8. The battery cell according to claim 7, wherein the protection circuit member is electrically connected to a positive electrode tab formed at the positive electrode of the electrode assembly and a negative electrode tab formed at the negative electrode of the electrode assembly.

9. The battery cell according to claim 8, wherein a positive electrode lead and a negative electrode lead are coupled to the positive electrode tab and the negative electrode tab to constitute a positive electrode terminal and a negative electrode terminal, respectively.

10. The battery cell according to claim 9, wherein the positive electrode terminal and the negative electrode terminal are disposed in tight contact with the body of the case in a state in which the positive electrode terminal and the negative electrode terminal are bent.

11. The battery cell according to claim 9, wherein the protection circuit member comprises a protection circuit board, a field effect transistor (FET) and a protection circuit formed at the protection circuit board, and a connection terminal electrically connected to the positive electrode terminal and the negative electrode terminal of the battery cell.

12. The battery cell according to claim 11, wherein the connection terminal is disposed in tight contact with the protection circuit board in a state in which the connection terminal is bent.

13. The battery cell according to claim 1, wherein the electrode assembly is a stacked type electrode assembly, wherein the positive electrode comprises a positive electrode plate, the negative electrode comprises a negative electrode plate, and the separator comprises a separation plate disposed between the positive electrode plate and the negative electrode plate, which is configured to have a structure in which the positive electrode plate, the separation plate, and the negative electrode plate are sequentially stacked.

14. The battery cell according to claim 1, wherein the electrode assembly comprises:

two or more polar bodies selected from a group consisting of a positive electrode plate, a negative electrode plate, and a stacked type electrode assembly, the stacked type electrode assembly comprising a second positive electrode plate, a second negative electrode plate, and a separation plate disposed between the second positive electrode plate and the second negative electrode plate; and a separation sheet for covering stacked surfaces and sides of the polar bodies;

wherein the positive electrode comprises either the positive electrode plate or the second positive electrode plate, and the negative electrode comprises either the negative electrode plate or the second negative electrode plate, and wherein each of the polar bodies is arranged in a stacked and folded type structure in which the polar bodies are stacked in a height direction such that the positive electrode and the negative electrode face each other with the separation sheet being disposed between the positive electrode and the negative electrode.

15. The battery cell according to claim 14, wherein the stacked type electrode assembly is configured to have a structure in which an uppermost one of the negative and positive electrode plates and a lowermost one of the negative and positive electrode plates have the same polarity or different polarities.

16. The battery cell according to claim 1, wherein the battery cell is selected from a group consisting of a battery cell having a circular planar structure, a battery cell having a polygonal planar structure, a battery cell having a polygonal planar structure in which at least one corner is curved, and a battery cell having a polygonal planar structure in which at least one side is curved.

17. The battery cell according to claim 1, wherein the case is a pouch-shaped case, configured to have a structure with a space for receiving the electrode assembly, formed of a metal can or a laminate sheet comprising a resin layer and a metal layer.

18. A battery pack comprising a battery cell according to claim 1.

19. A device comprising a battery pack according to claim 18 as a power source.

20. The device according to claim 19, wherein the device is selected from the group consisting of a mobile phone, a portable computer, a smart phone, a smart pad, a netbook computer, a light electronic vehicle (LEV), an electric vehicle, a hybrid electric vehicle, a plug-in hybrid electric vehicle, and a power storage device.

21. A battery cell comprising:

an electrode assembly comprising a positive electrode, a negative electrode, and a separator disposed between the positive electrode and the negative electrode;

a case in which the electrode assembly is mounted;

a positive electrode terminal electrically coupled with the positive electrode and protruding outward from the case;

a negative electrode terminal electrically coupled with the negative electrode and protruding outward from the case, wherein a body of the electrode assembly and a body of the case are provided with cut portions, wherein the cut portion of the electrode assembly defines a concavity extending into the body of the electrode assembly, wherein the cut portion of the case defines a concavity extending into the body of the case, and wherein the positive and negative electrode terminals protrude outward from the case into the cut portion of the case.

22. The battery cell according to claim 21, wherein the positive electrode terminal comprises a positive electrode lead coupled to a positive electrode tab, the positive electrode tab protruding from the positive electrode, and wherein the negative electrode terminal comprises a negative electrode lead coupled to a negative electrode tab, the negative electrode tab protruding from the negative electrode.

23. The battery cell according to claim 21, wherein the concavity of the case is received within the concavity of the electrode assembly.

* * * * *